US008831287B2

(12) United States Patent
Dasu et al.

(10) Patent No.: US 8,831,287 B2
(45) Date of Patent: Sep. 9, 2014

(54) SYSTEMS AND METHODS FOR SENSING OCCUPANCY

(75) Inventors: Aravind Dasu, Herndon, VA (US); Dean Mathias, North Logan, UT (US); Chenguang Liu, Logan, UT (US); Randy Christensen, Cove, UT (US); Bruce Christensen, Derby, KS (US)

(73) Assignee: Utah State University, Logan, UT (US)

( * ) Notice: Subject to any disclaimer, the term of this patent is extended or adjusted under 35 U.S.C. 154(b) by 0 days.

(21) Appl. No.: 14/124,998

(22) PCT Filed: Jun. 8, 2012

(86) PCT No.: PCT/US2012/041673
§ 371 (c)(1),
(2), (4) Date: Dec. 9, 2013

(87) PCT Pub. No.: WO2012/170898
PCT Pub. Date: Dec. 13, 2012

(65) Prior Publication Data
US 2014/0093130 A1    Apr. 3, 2014

Related U.S. Application Data

(60) Provisional application No. 61/494,987, filed on Jun. 9, 2011.

(51) Int. Cl.
*G06K 9/00* (2006.01)
*G06T 7/20* (2006.01)
*G06T 7/00* (2006.01)
*G08B 13/196* (2006.01)

(52) U.S. Cl.
CPC .......... *G06K 9/00771* (2013.01); *G06T 7/2053* (2013.01); *G08B 13/19606* (2013.01); *G06T 2207/30232* (2013.01); *G06T 7/0008* (2013.01)
USPC .......................................... 382/103; 348/143

(58) Field of Classification Search
CPC ................... B60R 21/015; B60R 2021/01315; G06K 9/00362; G06K 9/00832; G06K 9/00771; B60N 2/002; G06T 7/2053; G06T 2207/30268
USPC .......................................................... 382/103
See application file for complete search history.

(56) References Cited

U.S. PATENT DOCUMENTS 4,937,878 A * 6/1990 Lo et al. ......................... 382/103
5,121,201 A * 6/1992 Seki ............................... 348/143
(Continued)

FOREIGN PATENT DOCUMENTS

KR   1020070104999   10/2007
KR   1020080103586   11/2008
(Continued)

OTHER PUBLICATIONS

Intille, Stephen et al, "Real-Time Closed-World Tracking", Computer Vision and Pattern Recognition, 1997. Proceedings., 1997 IEEE Computer Society Conference on, p. 697-703, Jun. 1997.*
(Continued)

*Primary Examiner* — Gandhi Thirugnanam

(57) ABSTRACT

A computer implemented method for sensing occupancy of a workspace includes creating a difference image that represents luminance differences of pixels in past and current images of the workspace resulting from motion in the workspace, determining motion occurring in regions of the workspace based on the difference image, and altering a workspace environment based at least in part on the determined motion. The method also includes determining which pixels in the difference image represent persistent motion that can be ignored and determining which pixels representing motion in the difference image are invalid because the pixels are isolated from other pixels representing motion.

15 Claims, 19 Drawing Sheets

(56) References Cited

U.S. PATENT DOCUMENTS

| | | | |
|---|---|---|---|
| 5,489,827 A * | 2/1996 | Xia | 315/294 |
| 5,528,698 A * | 6/1996 | Kamei et al. | 382/100 |
| 5,684,887 A * | 11/1997 | Lee et al. | 382/107 |
| 5,835,613 A * | 11/1998 | Breed et al. | 382/100 |
| 5,845,000 A * | 12/1998 | Breed et al. | 382/100 |
| 6,005,958 A * | 12/1999 | Farmer et al. | 382/103 |
| 6,081,606 A * | 6/2000 | Hansen et al. | 382/107 |
| 6,141,041 A * | 10/2000 | Carlbom et al. | 348/169 |
| 6,141,432 A * | 10/2000 | Breed et al. | 382/100 |
| 6,198,998 B1 * | 3/2001 | Farmer et al. | 701/45 |
| 6,324,453 B1 * | 11/2001 | Breed et al. | 701/45 |
| 6,335,985 B1 * | 1/2002 | Sambonsugi et al. | 382/190 |
| 6,393,133 B1 * | 5/2002 | Breed et al. | 382/100 |
| 6,608,910 B1 * | 8/2003 | Srinivasa et al. | 382/100 |
| 6,841,780 B2 * | 1/2005 | Cofer et al. | 250/341.1 |
| 6,870,945 B2 * | 3/2005 | Schoepflin et al. | 382/103 |
| 6,961,443 B2 * | 11/2005 | Mahbub | 382/100 |
| 7,508,979 B2 * | 3/2009 | Comaniciu et al. | 382/154 |
| 7,511,613 B2 * | 3/2009 | Wang | 340/539.26 |
| 7,796,780 B2 * | 9/2010 | Lipton et al. | 382/103 |
| 7,801,330 B2 * | 9/2010 | Zhang et al. | 382/103 |
| 8,334,906 B2 * | 12/2012 | Lipton et al. | 348/169 |
| 2002/0104094 A1 * | 8/2002 | Alexander et al. | 725/105 |
| 2002/0122570 A1 * | 9/2002 | Paragios et al. | 382/103 |
| 2002/0181742 A1 * | 12/2002 | Wallace et al. | 382/104 |
| 2002/0181743 A1 * | 12/2002 | Khairallah et al. | 382/104 |
| 2003/0002738 A1 * | 1/2003 | Cooper | 382/199 |
| 2003/0021445 A1 * | 1/2003 | Larice et al. | 382/104 |
| 2003/0044045 A1 * | 3/2003 | Schoepflin et al. | 382/103 |
| 2003/0123704 A1 * | 7/2003 | Farmer et al. | 382/103 |
| 2003/0133595 A1 * | 7/2003 | Farmer et al. | 382/103 |
| 2003/0223617 A1 * | 12/2003 | Wallace et al. | 382/104 |
| 2004/0008773 A1 * | 1/2004 | Itokawa | 375/240.08 |
| 2004/0151342 A1 * | 8/2004 | Venetianer et al. | 382/103 |
| 2004/0234137 A1 * | 11/2004 | Weston et al. | 382/225 |
| 2004/0247158 A1 * | 12/2004 | Kohler et al. | 382/104 |
| 2005/0002544 A1 * | 1/2005 | Winter et al. | 382/104 |
| 2005/0058322 A1 * | 3/2005 | Farmer et al. | 382/103 |
| 2005/0196015 A1 * | 9/2005 | Luo et al. | 382/103 |
| 2005/0201591 A1 * | 9/2005 | Kiselewich | 382/104 |
| 2005/0271280 A1 * | 12/2005 | Farmer et al. | 382/224 |
| 2006/0170769 A1 * | 8/2006 | Zhou | 348/143 |
| 2007/0127824 A1 * | 6/2007 | Luo et al. | 382/224 |
| 2007/0176402 A1 * | 8/2007 | Irie et al. | 280/735 |
| 2007/0177800 A1 * | 8/2007 | Connell | 382/181 |
| 2008/0079568 A1 * | 4/2008 | Primous et al. | 340/541 |
| 2008/0226172 A1 * | 9/2008 | Connell | 382/181 |
| 2008/0273754 A1 * | 11/2008 | Hick et al. | 382/103 |
| 2009/0087025 A1 * | 4/2009 | Ma | 382/103 |
| 2010/0322476 A1 * | 12/2010 | Kanhere et al. | 382/103 |
| 2011/0260871 A1 * | 10/2011 | Karkowski | 340/573.1 |

FOREIGN PATENT DOCUMENTS

| | | |
|---|---|---|
| KR | 100883065 | 2/2009 |
| KR | 1020100121020 | 11/2010 |

OTHER PUBLICATIONS

Zhou, Xuhui et al. "A Master-Slave System to Acquire Biometric Imagery of Humans at Distance", Proceeding IWVS '03 First ACM SIGMM international workshop on Video surveillance, pp. 113-120, 2003.*

International Search Report and Written Opinion for PCT/US2012/041673, Dec. 28, 2012.

Bradski, G. and Davis, J., Motion Segmentation and Pose Recognition with Motion History Gradients, Machine Vision and Applications, vol. 13, 2002, pp. 174-184.

* cited by examiner

SYSTEMS AND METHODS FOR SENSING OCCUPANCY

STATEMENT REGARDING FEDERALLY SPONSORED RESEARCH/DEVELOPMENT

This invention was made with government support under Contract No. DE-EE0003114 awarded by the U.S. Department of Energy. The government has certain rights in the invention.

CROSS-REFERENCE TO RELATED APPLICATIONS

This application claims priority to U.S. Provisional Patent Application No. 61/494,987, filed Jun. 9, 2012.

BACKGROUND

In various situations, motion and/or occupancy of individuals in a room may be detected for various reasons. For example, the lighting and/or climate controls may be altered based on occupancy and/or the motion in the room. Altering the lighting, climate, etc. based on the motion and/or occupancy of a room by individuals may reduce energy costs.

DISCLOSURE OF THE INVENTION

A computer implemented method for sensing occupancy of a workspace includes creating a difference image that represents luminance differences of pixels between past and current images of the workspace resulting from motion in the workspace, determining motion occurring in regions of the workspace based on the difference image, and altering a workspace environment based at least in part on the determined motion. The method also includes determining which pixels in the difference image represent persistent motion that can be ignored and determining which pixels representing motion in the difference image are invalid because the pixels are isolated from other pixels representing motion.

Another example of a computer implemented method for sensing occupancy of a workspace includes creating a difference image that represents luminance differences of pixels in two sequential images of the workspace resulting from motion in the workspace, the difference image including motion pixels and non-motion pixels, determining which motion pixels are invalid by comparing the motion pixels to adjacent pixels and changing the motion pixels to non-motion pixels if the adjacent pixels are not also motion pixels, creating an updated difference image with the pixels changed from motion pixels to non-motion pixels, and altering a workspace environment based at least in part on the updated difference image.

A further computer implemented method for sensing occupancy of a workspace includes creating a difference image that represents luminance differences of pixels in two sequential images of the workspace resulting from motion in the workspace, the difference image including motion pixels and non-motion pixels, creating a persistence image having pixels corresponding to pixels of the difference image, and altering a workspace environment based at least in part on the persistence and difference images. A value of a pixel in the persistence image is increased each time a corresponding motion pixel is identified in the difference image, the value being decreased when a corresponding non-motion pixel is identified in the difference image, wherein the pixel in the persistence image is ignored when the value exceeds a threshold value.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a schematic diagram of an example difference image using the digital image of FIG. 4.

FIG. 6 is a schematic diagram of a corrected difference image.

Figure 1:
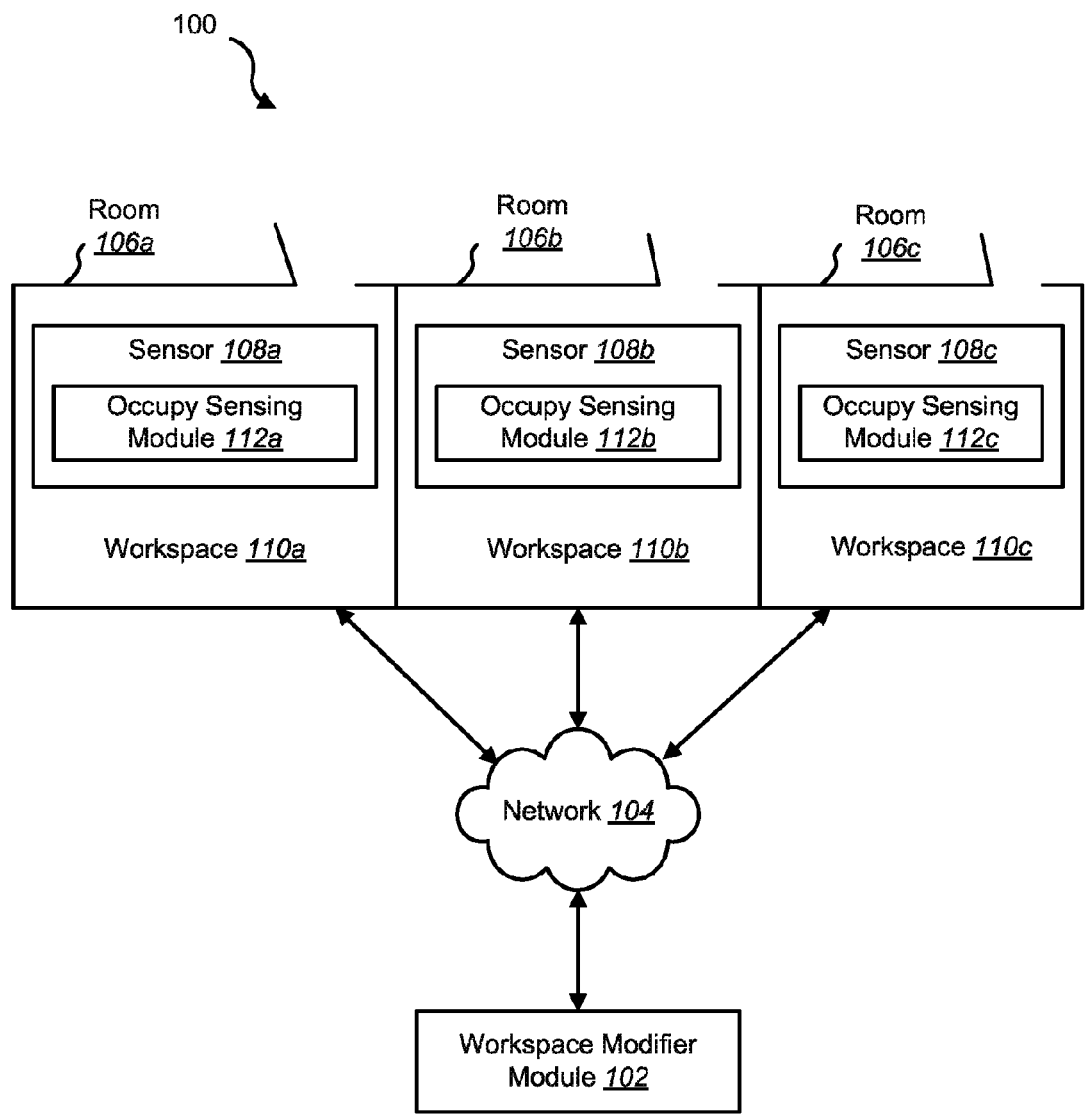
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

BEST MODE(S) FOR CARRYING OUT THE INVENTION

Building efficiency and energy conservation is becoming increasingly important in our society. One way to conserve energy is to power devices in a workspace only when those devices are needed. Many types of devices are needed only when the user is within a workspace or in close proximity to such devices. One scenario is an office workspace that includes a plurality of electronic devices such as lighting, heating and air conditioning, computers, telephones, etc. One aspect of the present disclosure relates to monitoring the presence of an occupant within the office workspace, and turning on and off at least some of the electronic devices based on the user's proximity to the office workspace.

An occupancy sensor system and related methods may be used to determine when an occupant's current location is within a given workspace. A sequence of images of the workspace may be used to determine the occupant's location. The sequence allows motion data to be extracted from the images. The current and past motion from the images comprises what may be referred to as motion history. Occupancy information may be used, for example, so that lighting within the space may be adjusted to maximally reduce energy consumption. Another example is altering room heating or cooling or providing other environmental controls in response to determining the occupant's location. Typically, the space to monitor and sense occupancy is referred to as a workspace, and typically has physical boundaries. For example, the workspace may have one or more fixed entrance locations that are monitored relative to other portions of the workspace.

Referring now to FIG. 1, an example system 100 is shown including a workspace modifier module 102 coupled via a network 104 to a plurality of occupy sensors 108a-c, which monitor workspaces 110a-c of rooms 106a-c, respectively. The sensors 108a-c monitor the workspaces 110a-c and include occupy sensing modules 112a-112c. The sensor modules 108a-c transmit data such as, for example, occupied/unoccupied status of the rooms 106a-c to workspace modifier module 102 via a communications medium. The communications medium may include, for example, a network 104 such as a wireless or local area network.

The workspace modifier module 102 may be positioned remotely from the rooms 106a-c. Alternatively, the workspace modifier module 102 may be housed locally in close proximity to one or more of the rooms 106a-c. Furthermore, the rooms 106a-c may be positioned adjacent to each other or be positioned at locations remote from each other. While a plurality of rooms 106a-c is shown in FIG. 1, other systems may include a single room or four or more rooms. Also, while rooms 106a-c provide boundaries for the workspaces 110a-c, other arrangements are possible wherein the workspaces 110a-c are defined by other criteria including, for example, a sensing field of the sensors 108a-c.

Figure 2:
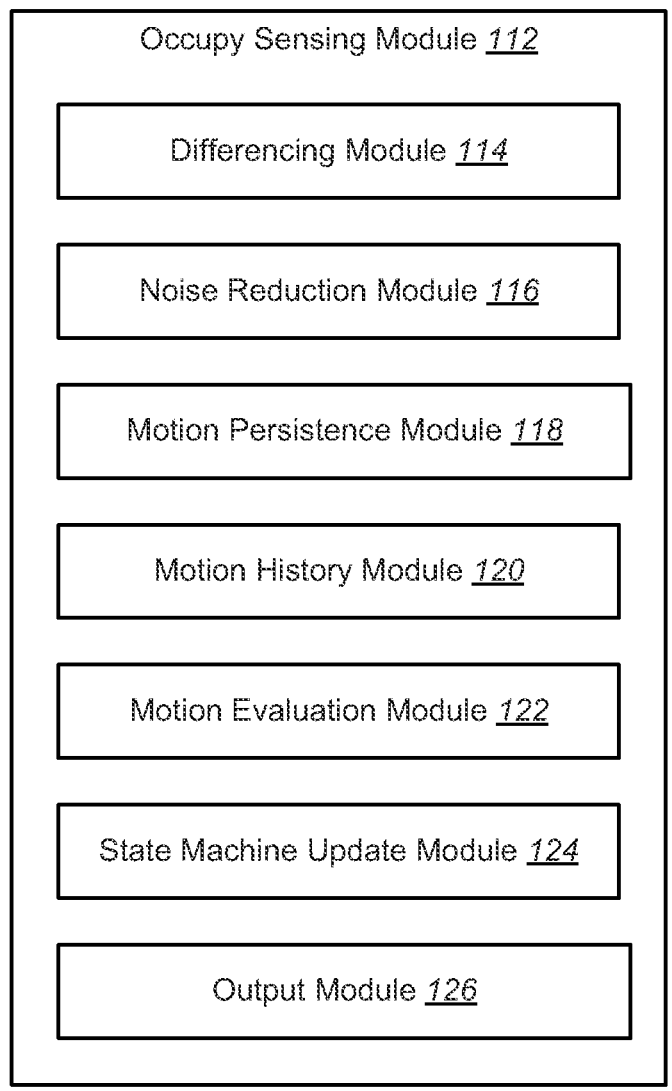
FIG. 2 is a block diagram illustrating an example occupy sensing module in accordance with the present disclosure.

Referring to FIG. 2, the occupy sensing module 112 may include a plurality of modules that perform various functions related to the systems and methods. Occupy sensing module 112 may include, for example, a differencing sensing module 114, a noise reduction module 116, a motion persistence module 118, a motion history module 120, a motion evaluation module 122, a state machine update module 124, and an output module 126. At least some functions of the modules included in occupy sensing module 112 will be described below with reference to some of the remaining figures. Various configurations may be possible for occupy sensing module 112 that include more or fewer modules than those shown in FIG. 2.

The differencing module 114 may perform comparison of past and current images and create the differencing image as described below with reference to FIG. 5. The noise reduction module 116 may create updates to the differencing image as described below with reference to FIG. 6. The motion persistence module 118 may help identify persistent movement that can be ignored and create a persistence image as described below with reference to FIG. 7. The motion history module 120 may create a history of detected motion and a motion history image as described below with reference to FIG. 8. The motion evaluation module 122 and state machine update module 124 may use the motion information from FIGS. 4-8 to determine occupancy of a room as described below with reference to FIGS. 9 and 10 and the method of FIGS. 11-15.

Figure 3:
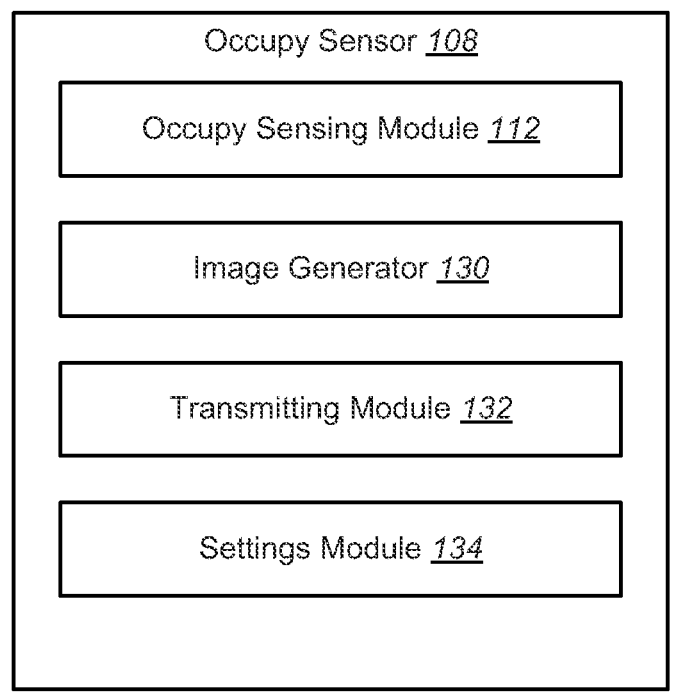
FIG. 3 is a block diagram illustrating one example of a occupy sensor in accordance with the present disclosure.

The occupy sensors 108a include various components and modules in addition to an occupy sensing module 112, as shown in FIG. 3. For example, occupy sensor 108 may include an image generator 130, a transmitting module 132, and a settings module 134. The image generator 130 may include, for example, a camera and lens that collect digital images. The transmitting module 132 may provide communication between the occupy sensor and the workspace modifier module 102. The settings module 134 may provide adjustability of the settings for occupy sensor 108 including, for example, the timing in which images are collected and transmitted by occupy sensor 108.

Other types of sensors may be associated with the system 100 of FIG. 1. For example, motion sensors, heat sensors and the like may be used to help determine the presence of an occupant in the workspaces 110a-c.

Figure 4:
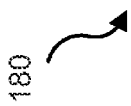
FIG. 4 is a schematic diagram of a digital image having a plurality of pixels.

Referring now to FIG. 4, a schematic digital image 180 is shown having a plurality of pixels labeled A1-An, B1-Bn, C1-Cn, D1-Dn, E1-E7 and F1-F2. The image 180 may include hundreds or thousands of pixels within the image. The image may be collected by the occupy sensor 108 (e.g., the image generator 130). The image 180 may be delivered to the occupy sensing module 112 for further processing in accordance with the systems and methods disclosed herein.

Figure 5:
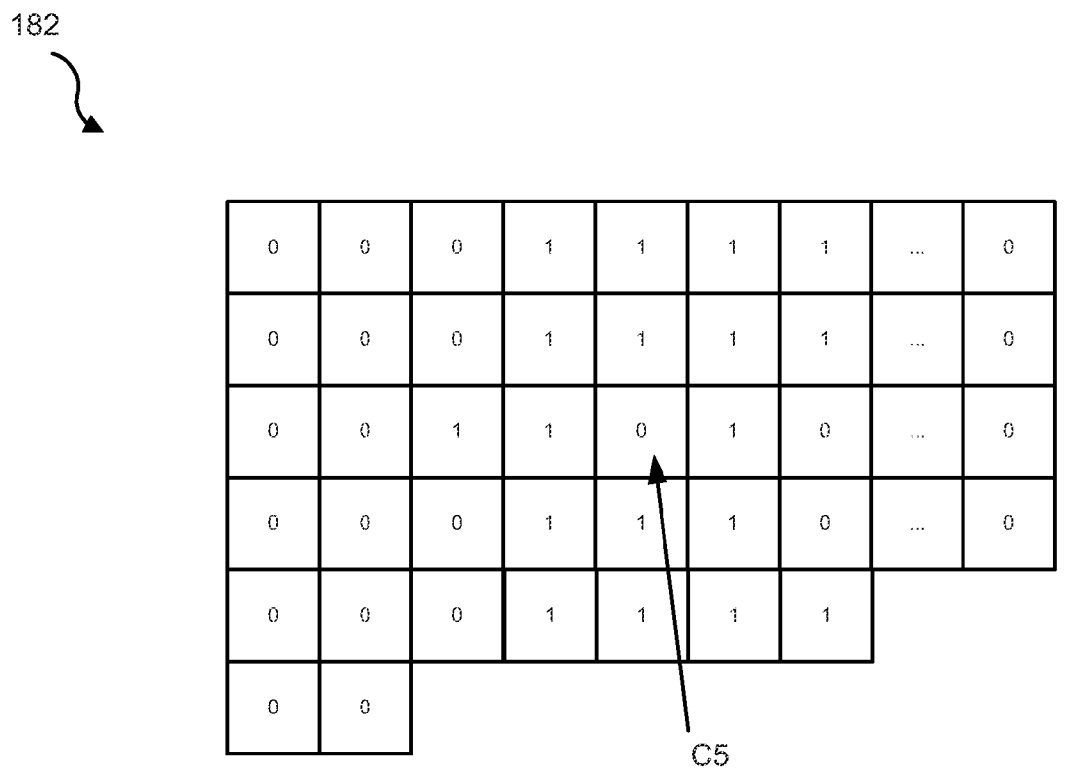

Referring now to FIG. 5, an example difference image 182 is shown with a plurality of pixels that correspond to the pixels of the image 180 shown in FIG. 4. The difference image 182 represents the difference between two sequential images 180 that are collected by the occupy sensor 108. The two sequential images may be referred to as a previous or prior image and a current image. For each pixel in the difference image 182, the absolute value of the difference in luminance between the current image and the previous image is compared to a threshold value. In at least one environment, if the difference is greater than the threshold value, the corresponding pixel in the difference image 182 is set to 1 or some other predefined value. If the difference is less than the threshold value, the corresponding pixel in the difference image is set to 0 or some other preset value. The color black may correspond to 0 and white may correspond to 1. The threshold value is chosen to be an amount sufficient to ignore differences in luminance values that should be considered noise. The resulting difference image 182 contains a 1 (or white color) for all pixels that represent motion between the current image and the previous image and a 0 (or black color) for all pixels that represent no motion. The pixel C5 is identified in FIG. 5 for purposes of tracking through the example images described below with reference to FIGS. 6-8.

Figure 6:
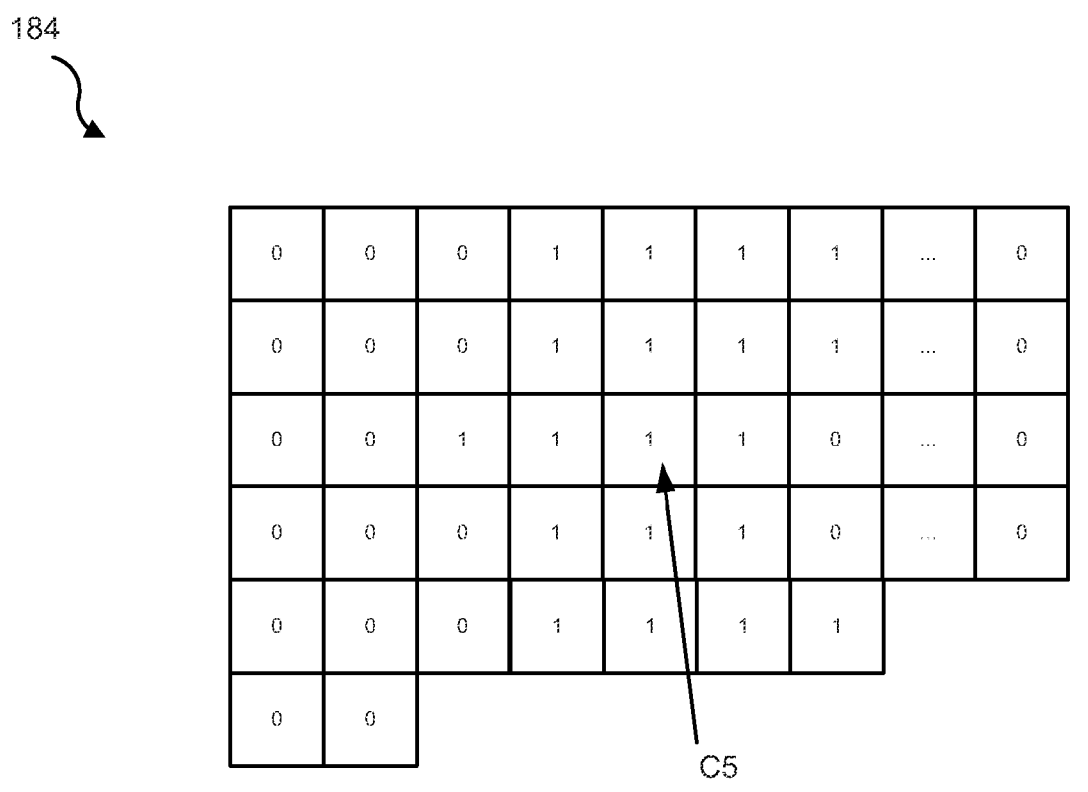

FIG. 6 shows a corrected difference image 184 that represents a correction to the difference image 182 wherein pixels representing motion in the difference image that should be considered invalid are changed because they are isolated from other pixels in the image. Such pixels are sometimes referred to as snow and may be considered generally as "noise." In one embodiment, each pixel in the difference image 182 that does not lie on the edge of the image and contains the value 1, retains the value of 1 if the immediate neighboring pixel (adjacent and diagonal) is also 1. Otherwise, the value is changed to 0. Likewise, each pixel with a value of 0 may be changed to a value of 1 if the eight immediate neighboring pixels are 1, as shown for the pixel C5 in FIG. 6.

Figure 7:
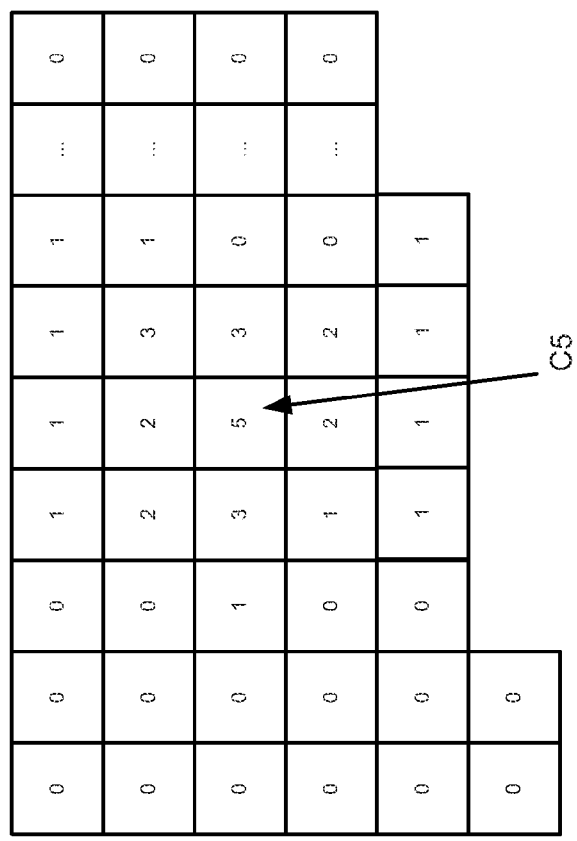
FIG. 7 is a schematic diagram of an example persistence image based on the corrected difference image of FIG. 6.

FIG. 7 schematically represents an example persistence image 186 that helps in determining which pixels in the corrected difference image 184 may represent persistent motion, which is motion that is typically considered a type of noise and can be ignored. Each time a pixel in the corrected difference image 184 (or the difference image 182 if the correction shown in FIG. 6 is not made) represents valid motion, the value of the corresponding pixel in the persistence image 186 is incremented by 1. The incremental increase typically does not exceed a predetermined maximum value.

Each time a pixel in the corrected difference image 184 does not represent valid motion, the value of the corresponding pixel in the persistence image 186 is decremented. In one embodiment, the persistence image is decremented by 1, but may not go below 0. If the value of a pixel in a persistence image 186 is above a predetermined threshold, that pixel is considered to represent persistent motion. Persistent motion is motion that reoccurs often enough that it should be ignored (e.g., a fan blowing in an office workspace). In the example of FIG. 7, if the threshold value were 4, then the pixel C5 would have exceeded the threshold and the pixel C5 would represent persistent motion.

Figure 8:
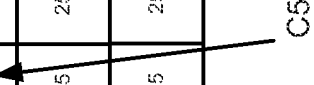
FIG. 8 is a schematic diagram of an example motion history image based on the corrected difference image of FIG. 7.

FIG. 8 schematically shows an example motion history image 188 that is used to help determine the history of motion in the workspace. In one embodiment, each time a pixel in the current image 180 represents valid, nonpersistent motion (e.g., as determined using the corrected difference image 184 and the persistence image 186), the corresponding pixel in the motion history image 188 is set to a predetermined value such as, for example, 255. Each time a pixel in the current image 180 does not represent valid, nonpersistent motion, the corresponding pixel in the motion history image 188 is decremented by some predetermined value (e.g., 1, 5, 20). This decremented value may be referred to as decay. The resulting value of each pixel in the motion history image 188 indicates how recently motion was detected in that pixel. The larger the value of a pixel in the motion history image 188, the more recent the motion occurred in that pixel.

FIG. 8 shows a value 255 in each of the pixels where valid, nonpersistent motion has occurred as determined using the corrected difference image 184 and the persistence image 186 (assuming none of the values in persistence image 186 have exceeded the threshold value). The pixels that had been determined as having either invalid or nonpersistent motion (a value of 0 in images 184, 186) have some value less than 255 in the motion history image 188.

Figure 9:
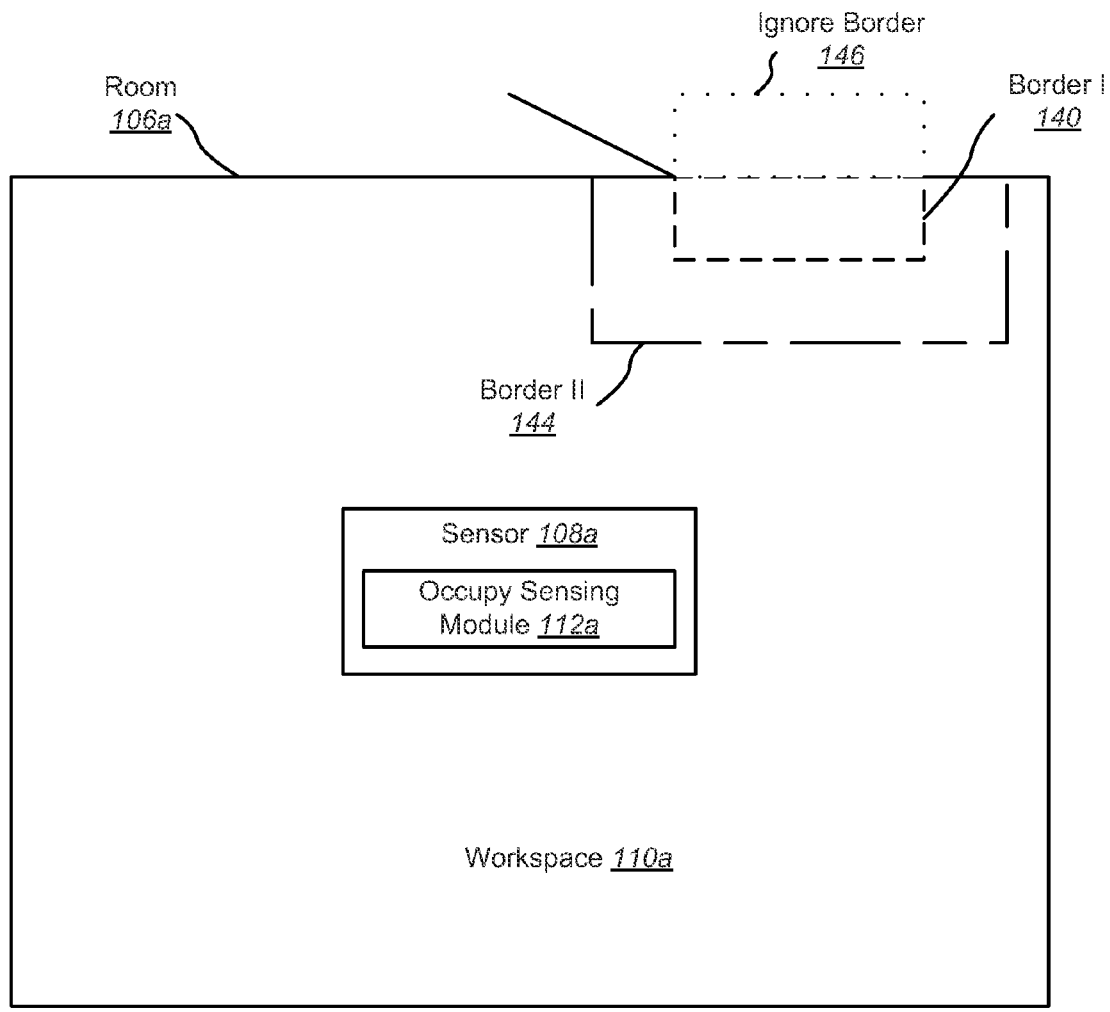
FIG. 9 is a block diagram illustrating an example room from the environment of FIG. 1.

Referring now to FIG. 9, a further step may be to evaluate the number of pixels that represent motion in particular regions in the image. Assuming the image 180 represents an entire footprint of the room 106a, the region in the image includes the area or regions defined by workspace 110a, border I 140, and border II 144. Borders may be next to or near an entrance to a workspace 110a. The number of pixels that represent valid, nonpersistent motion is counted for each of these regions. If there are no motion pixels in any of the regions, a motion disappeared trigger is enabled. If there are more motion pixels in the workspace 110a region than both of the border I 140 and border II 144 regions individually, a workspace motion trigger is enabled. If there are more motion pixels in border II 144 region than a predetermined threshold, a border II motion trigger is enabled. If there are more motion pixels in border I 140 region than border II 144 region, and if there are more motion pixels in border I 140 region than the workspace 110a region, a border I motion trigger is enabled. If no motion has been detected for some predetermined timeout period, a safe timeout trigger is enabled.

The room 106a may include a further border reference as ignore border 146. In the event the sensor 108a is able to see through the entrance of the room 106a (e.g. through an open door) into a space beyond border I 140, movement beyond the ignore border 146 may be masked and ignored.

A state machine may be updated using the triggers generated in the region motion evaluation discussed with reference to FIG. 9. Each possible trigger may have an associated priority. In one embodiment, the decreasing priorities are: motion disappear, work space motion, board one motion, border two motion, and safe timeout. Each enabled trigger is evaluated in order of decreasing priority. If, for example, the currently evaluated trigger is the workspace motion trigger, the workspace motion signal updates the state machine and all other enabled triggers are discarded. This particular priority may be implemented because workspace motion makes any other motion irrelevant.

Proper placement in sizing of the borders shown in FIG. 9 and in other configurations may help optimize operation of the occupy sensing systems and methods discussed herein. Proper placement and size of the borders may allow the system to more accurately decide when an occupant has entered and departed a workspace. The borders may occupy enough pixels in the collected image such that the system may detect the occupant's presence within each of the borders. In one embodiment, three borders are used: border I 140, border II 144, and ignore border 146. Border I 140 is shown in FIG. 9 having a rectangular shape and may be positioned at the door opening. Border I 140 may be placed inside the workspace 110a and as near the doorway as possible without occupying any pixels that lie outside of the doorway within the ignore border 146. Typically, a side that is positioned adjacent to the door opening is at least as wide as the width of the door.

Border II 144 may be placed around at least a portion of the periphery of border I 140. Border II 144 may surround all peripheral surfaces of border I 140 that are otherwise exposed to the workspace 110a. Border II 144 may be large enough that the system can detect the occupant's presence in border II 144 separate and distinct from detecting the occupant's presence in border I 140.

The ignore border 146 may also be rectangular in shape (or any other suitable shape) and is placed adjacent to border I 140 adjacent to the door opening. The ignore border 146 may be used to mask pixels in the image (e.g., image 180) that are outside of the workspace 110a, but that are visible in the image. Any motion within the ignore border 146 is typically ignored.

A state machine may be used to help define the behavior of the occupy sensor and related system and methods. In one example, there are four states in the state machine: not occupy, border I motion, border II motion, and workspace occupy. Other examples may include more or fewer states depending on, for example, the number of borders established in the workspace. The not occupy state may be valid initially and when the occupant has moved from border I to somewhere outside of the workspace. If the occupant moves from border I to somewhere outside of the workspace, the workspace environment may be altered (e.g., lights being turned off). The border I motion state may be valid when the occupant has moved into border I from either outside the workspace or from within the workspace. The border II motion state may be valid when the occupant has moved into border II from either border I or the workspace. If the occupant enters border II from border I, workspace environment may be altered (e.g., the workspace lights are turned on). The workspace occupy state may be valid when the occupant has moved into the workspace from either border I or border II.

Figure 10:
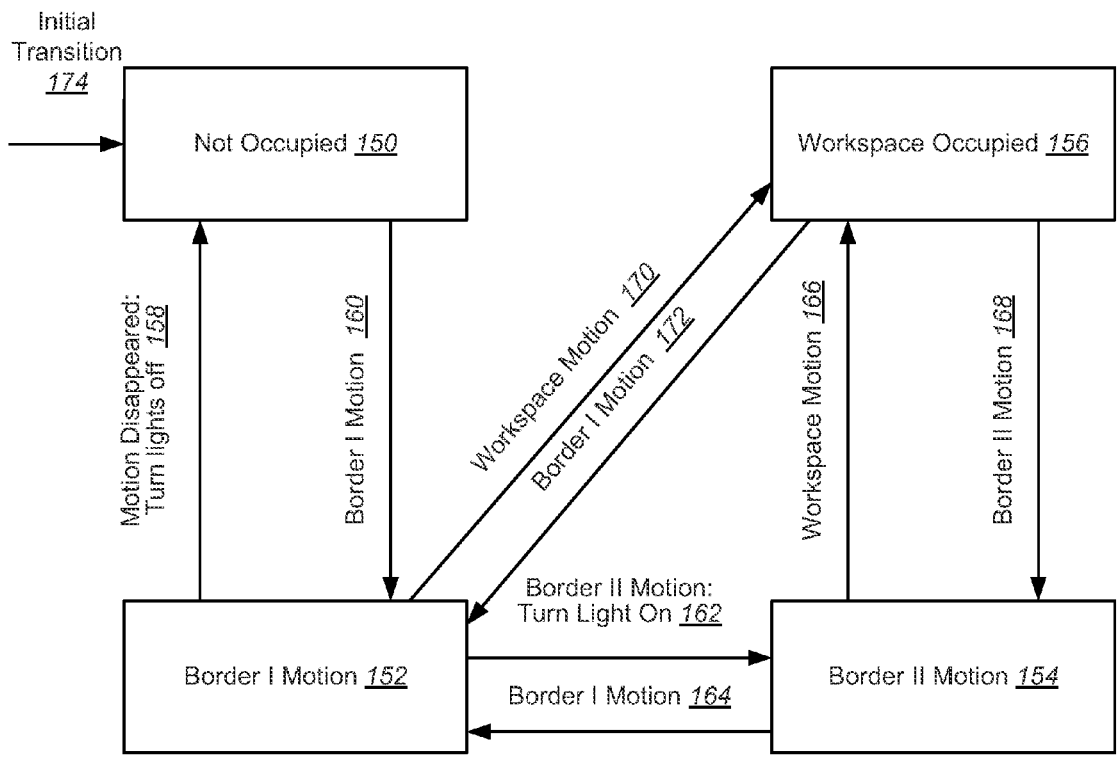
FIG. 10 is a block diagram showing a relationship of states related to workspace occupancy according to the systems and methods described herein.

FIG. 10 schematically illustrates an example state machine having the four states described above. The state machine is typically set to not occupied 150 in an initial transition 174. Border I motion 152, border II motion 154, and workspace occupy state 156 are interconnected with arrows that represent the movement of the occupant from one space or border to another.

A motion disappear trigger may result, for example, in lights being turned off 158, and may occur as the occupant moves from border I 140 and into the ignore border 146. A border I motion trigger 160 may occur as the occupant moves from outside of the workspace 110a and into the border I 140. A border II motion trigger 162, resulting, for example, in turning a light on, may occur as the occupant moves from border I 140 to border II 144. A border I motion trigger 164 may occur as the occupant moves from border II 144 to border I 140. A workspace motion trigger 166 may occur as the occupant moves from border II 144 to the workspace 110a. A border II motion trigger 168 may occur when an occupant moves from the workspace 110a to the border II 144. A workspace motion trigger 170 may occur as the occupant moves from border I 140 to the workspace 110a. A border I motion trigger 172 may occur as the occupant moves from the workspace 110a to border I 152.

Figure 11:
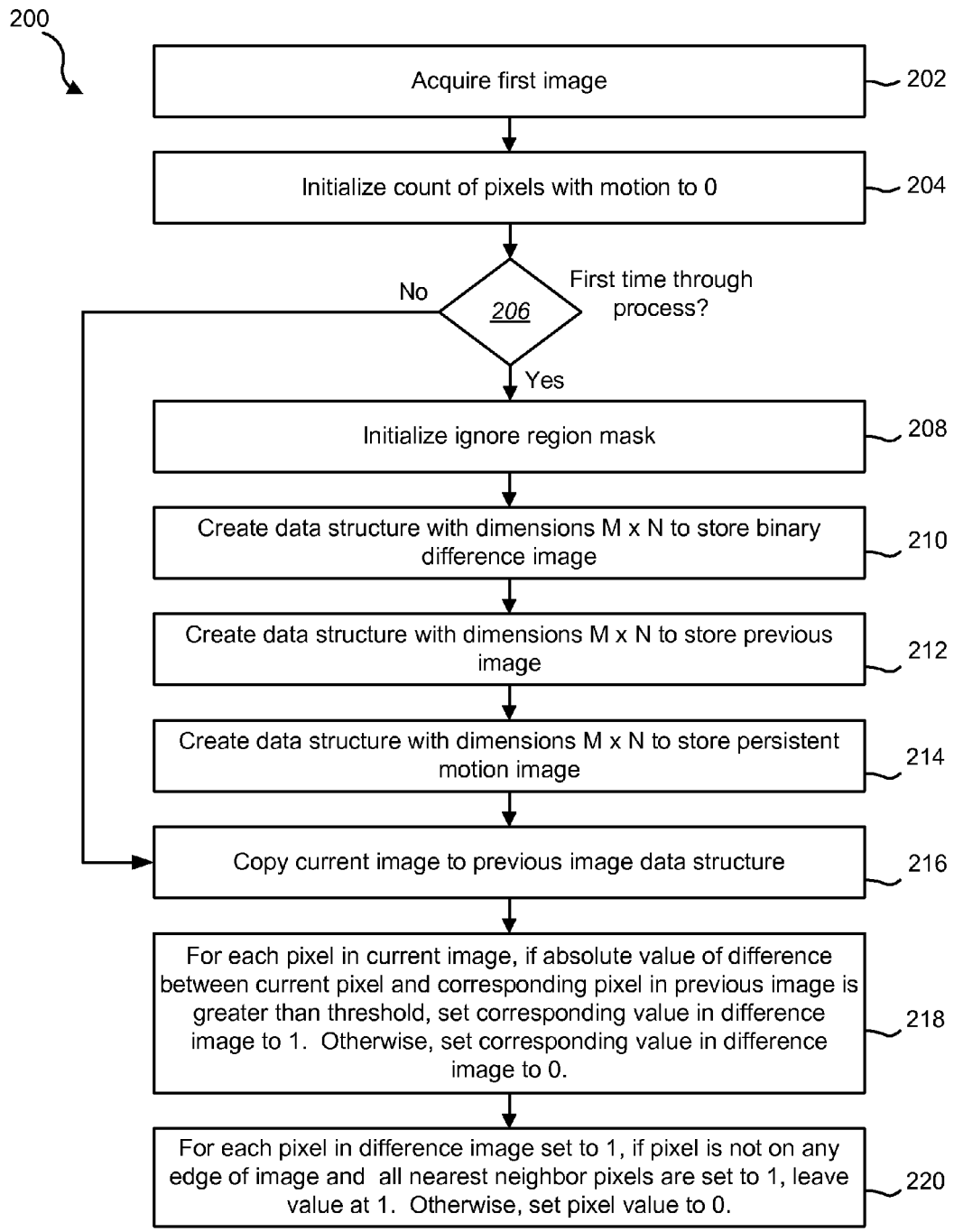
FIG. 11 is a flow diagram illustrating a portion of one example method of determining occupancy of a room.

Referring now to FIGS. 11-15, a detailed method 200 is described in which steps outlining a method for determining occupancy of a workspace from an image M pixels wide by N pixels high as shown. FIG. 11 shows the method 200 beginning with acquiring a first image 202 and initializing the count of pixels with motion to 0 in the step 204. A step 206 determines whether this is the first time through the method. If so, the method moves onto step 208 initializing an ignore region mask. If not, the system moves to step 216 and skips the steps of creating various data structures and the ignore mask region in steps 208, 210, 212 and 214.

Step 210 includes creating a data structure with dimensions M×N to store a binary difference image. Steps 212 includes creating a data structure with dimensions M×N to store the previous image. Step 214 includes creating a data structure with dimensions M×N to store a persistent motion image. The following step 216 includes copying a current image to the previous image data structure. For each pixel in the current image, if an absolute value of difference between the current pixel and corresponding pixel in a previous image is greater than a threshold, a corresponding value is set in a difference image to 1. Otherwise, a corresponding value is set in a difference image to 0 in the step 218. The step 220 includes leaving the value of a pixel at 1, for each pixel in the difference image set to 1, if the pixel is not on any edge of the image and all nearest neighbor pixels are set to 1. Otherwise, the pixel value is set at 0.

Figure 12:
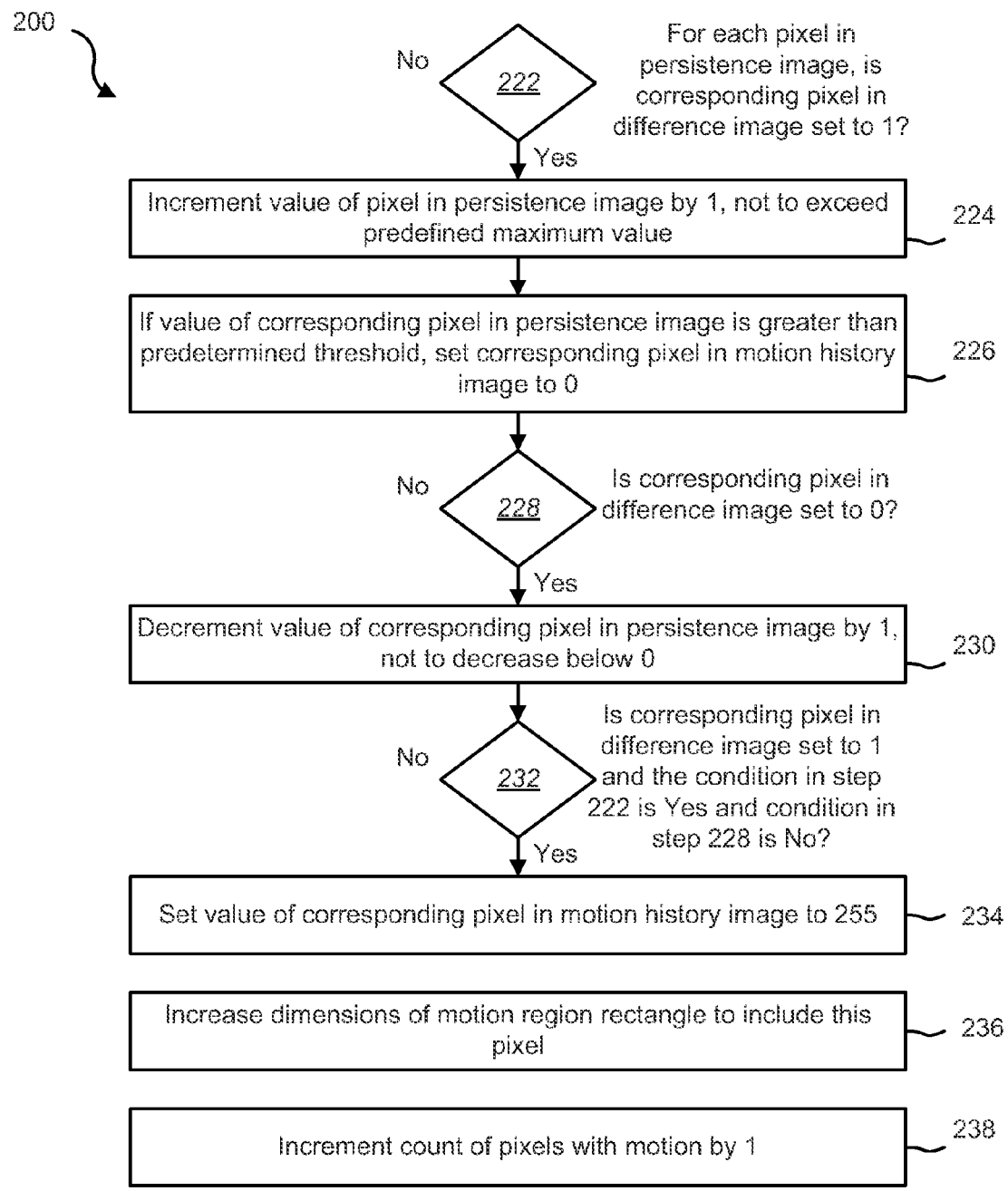
FIG. 12 is a flow diagram illustrating another portion of the example method of FIG. 11.

FIG. 12 shows further example steps of method 200. The method 200 may include determining for each pixel in the persistence image whether the corresponding pixel in the difference image is set to 1 in a step 222. Further step 224 includes incrementing the value of the pixel in the persistence image by 1, and not to exceed a predefined maximum value. If the value of the corresponding pixel and the persistence image is greater than a predetermined threshold, the corresponding pixel is set in the motion history image to 0 in a step 226.

A step 226 includes determining whether a corresponding pixel in a difference image is set to 0. If so, step 230 includes decrementing a value of the corresponding pixel in a persistence image by 1, and not to decrease below the value of 0. If a corresponding pixel in the difference image is set to 1 and the condition in step 222 is yes and the condition in step 228 is no, then a further step 234 includes setting a value of the corresponding pixel in a motion history image 255 or some other predefined value. A step 236 includes increasing the dimension of the motion region rectangle to include this pixel. An increment count of pixels with motion is increased by 1 in the step 238.

Figure 13:
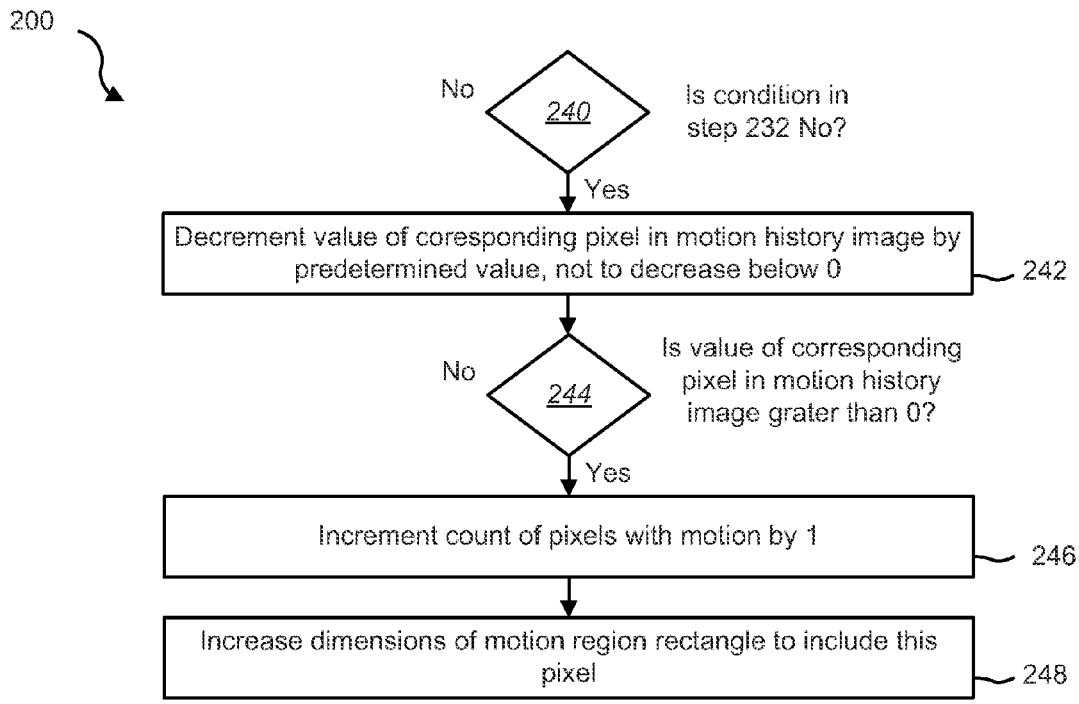
FIG. 13 is a flow diagram illustrating another portion of the example method of FIGS. 11 and 12.

FIG. 13 shows potential additional steps of method 200 including determining whether the condition in step 232 is no. If so, a step 242 includes decrementing a value of the corresponding pixel in the motion history image by a predetermined value, and not to decrease below a value of 0. If the value of the corresponding pixel in the motion history image is greater than 0, according to a step 244, a step 246 includes incrementing a count of pixels with motion by 1. A step 248 includes increasing a dimension of the motion region rectangle to include this pixel.

Figure 14:
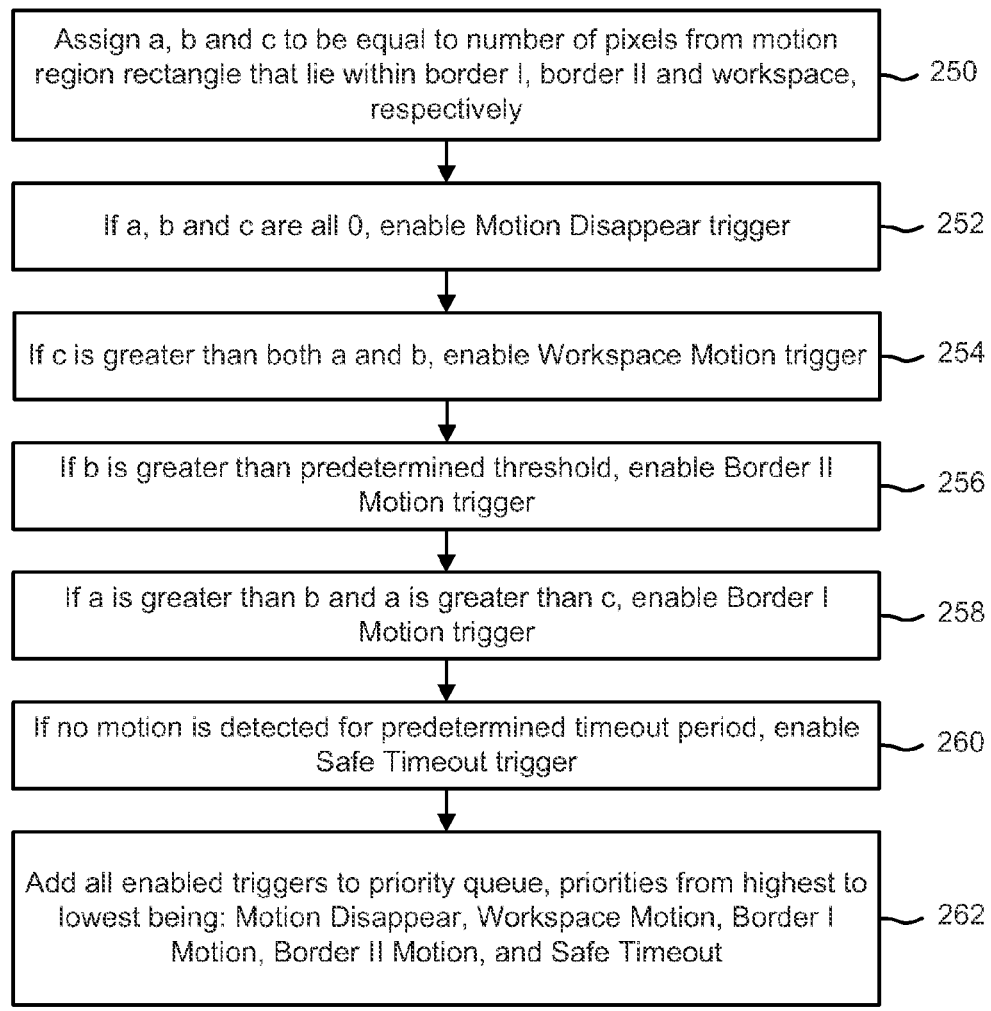
FIG. 14 is a flow diagram illustrating another portion of the example method of FIGS. 11-13.

FIG. 14 shows potential additional steps of the method 200 including a step 250 of assigning a, b and c to be equal to the number of pixels from a motion region rectangle that lie within Border I 140, Border II 144, and the workspace 110a, respectively. If a, b and c are all 0, a motion disappear trigger is enabled in step 252. If c is greater than both a and b, a workspace motion trigger is enabled in a step 254. If b is greater than a predetermined threshold, a border II motion trigger is enabled in a step 256. If a is greater than b and a is greater than c, a border I motion is triggered in a step 258. If no motion is detected for a predetermined timeout period, a safe timeout trigger is enabled in a step 260. All enabled triggers may be added to a priority queue in a step 262. The priority may be arranged highest to lowest as according to a step 262: motion disappear, workspace motion, border I motion, border II motion, and safe timeout.

Figure 15:
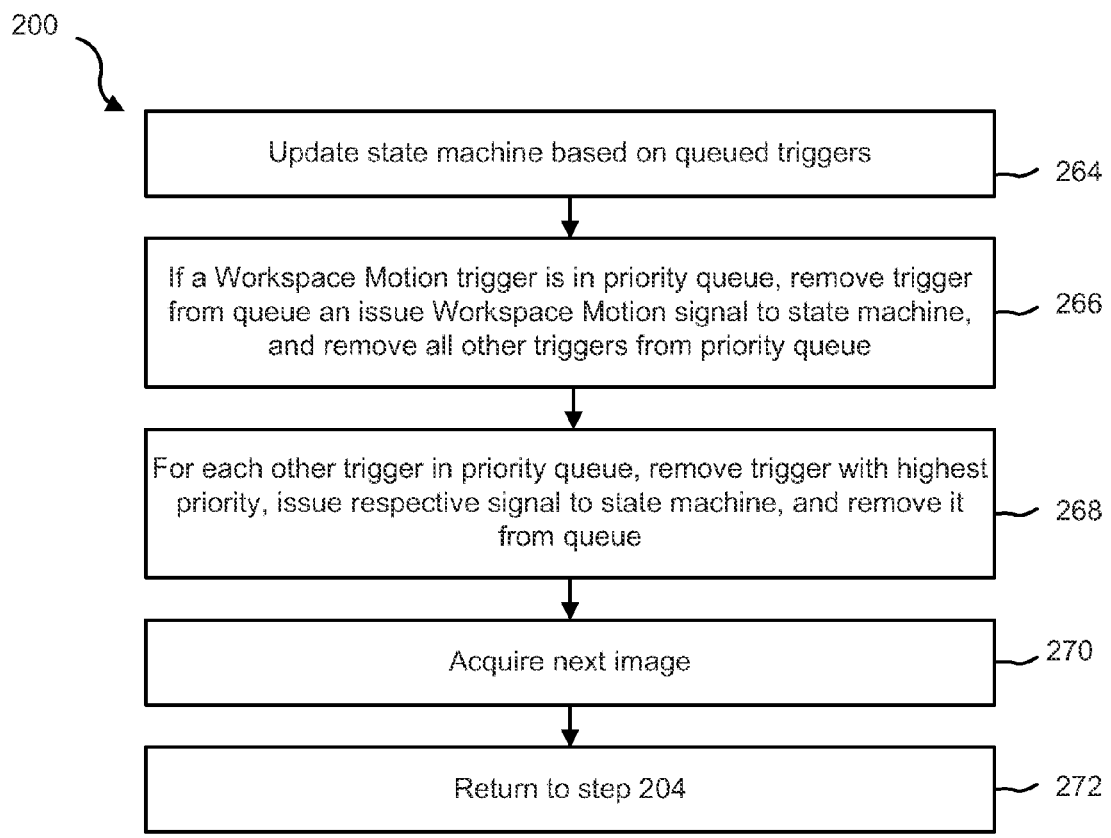
FIG. 15 is a flow diagram illustrating another portion of the example method of FIGS. 11-14.

FIG. 15 shows further example steps of method 200. A step 264 includes updating a state machine based on the queue triggers. If a workspace motion trigger is in the priority queue, the trigger is removed from the queue and a workspace motion signal is issued to the state machine, according to a step 266. All of the other triggers may be removed from the priority queue. For each other trigger in the priority queue, a trigger with the highest priority is removed, a respective signal is issued to the state machine, and the trigger is removed from the queue according to a step 268. Further step 270 may include acquiring the next image and the process returns to step 204 according to step 272 through at least some of those steps shown and described with reference to method 200 of FIGS. 11-15.

Figure 16:
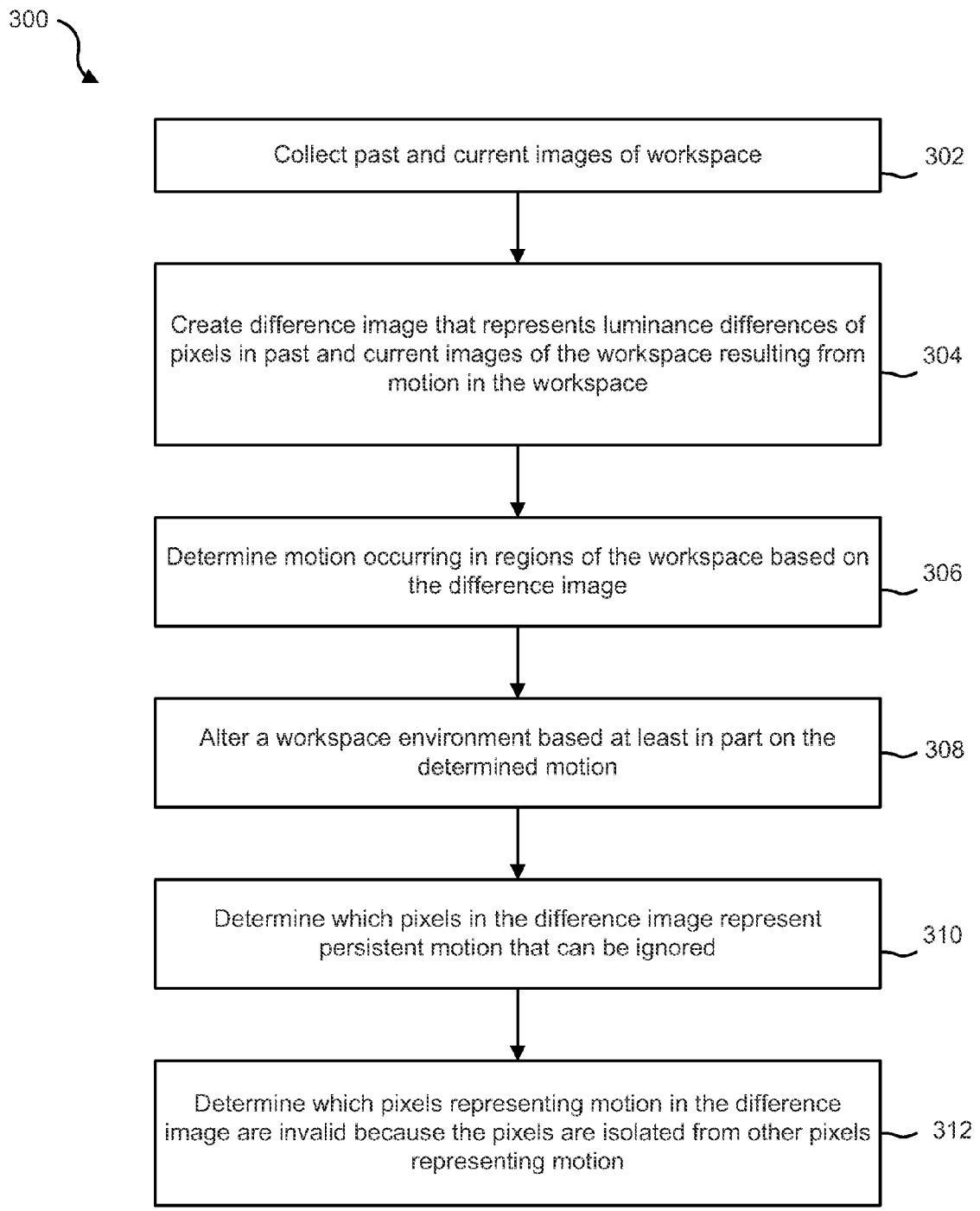
FIG. 16 is a flow diagram illustrating an example method for sensing occupancy of a workspace.

Many other methods may be possible in accordance with the various systems, embodiments and features disclosed herein. An example method 300 is shown with reference to FIG. 16. A method 300 may include collecting past and current images of a workspace in a step 302. A step 304 may include creating the difference image that represents luminance differences in pixels in past and current images of the workspace resulting from motion in the workspace. A step 306 includes determining motion occurring in regions of the workspace based on the difference image. A step 308 includes altering a workspace environment based at least in part on the determined motion. Other steps of the method 300 may include determining which pixels in the difference image represent persistent motion that can be ignored in a step 310 and determining which pixels representing motion in the difference image are invalid because the pixels are isolated from other pixels representing motion in a step 312.

Another example step may include determining the number of pixels representing motion in each of a plurality region in the workspace and creating a trigger representative of which region has the most pixels representing motion. The method 300 may include evaluating the triggers based on a preset priority. The method 300 may include updating a state machine using a signal representing the evaluated triggers, wherein the state machine controls the workspace environment.

Creating the difference image according to method 300 may include comparing an absolute value of the difference in luminance between the images to a threshold value, setting a corresponding pixel in the difference image to 1 if the difference is greater than the threshold value, and setting the corresponding pixel in the difference image to 0 if the difference is less than the threshold value. The method 300 may further include comparing every pixel representing motion to immediate neighboring pixels, and if the immediate neighboring pixels are not pixels representing motion, changing a value of the pixel. The method 300 may include creating a persistence image having a pixel corresponding to each pixel in the difference image, wherein the pixels in the persistence image power increment in value each time a pixel in the difference image is determined to represent motion. The method 300 may include creating a motion history image representing how recently motion was detected in each pixel representing motion in the difference image. A further step may include assigning a pixel value to pixels in the motion history image corresponding to pixels in the difference image representing motion, and subtracting from the pixel value each time a pixel in the current image is determined to not represent motion.

Figure 17:
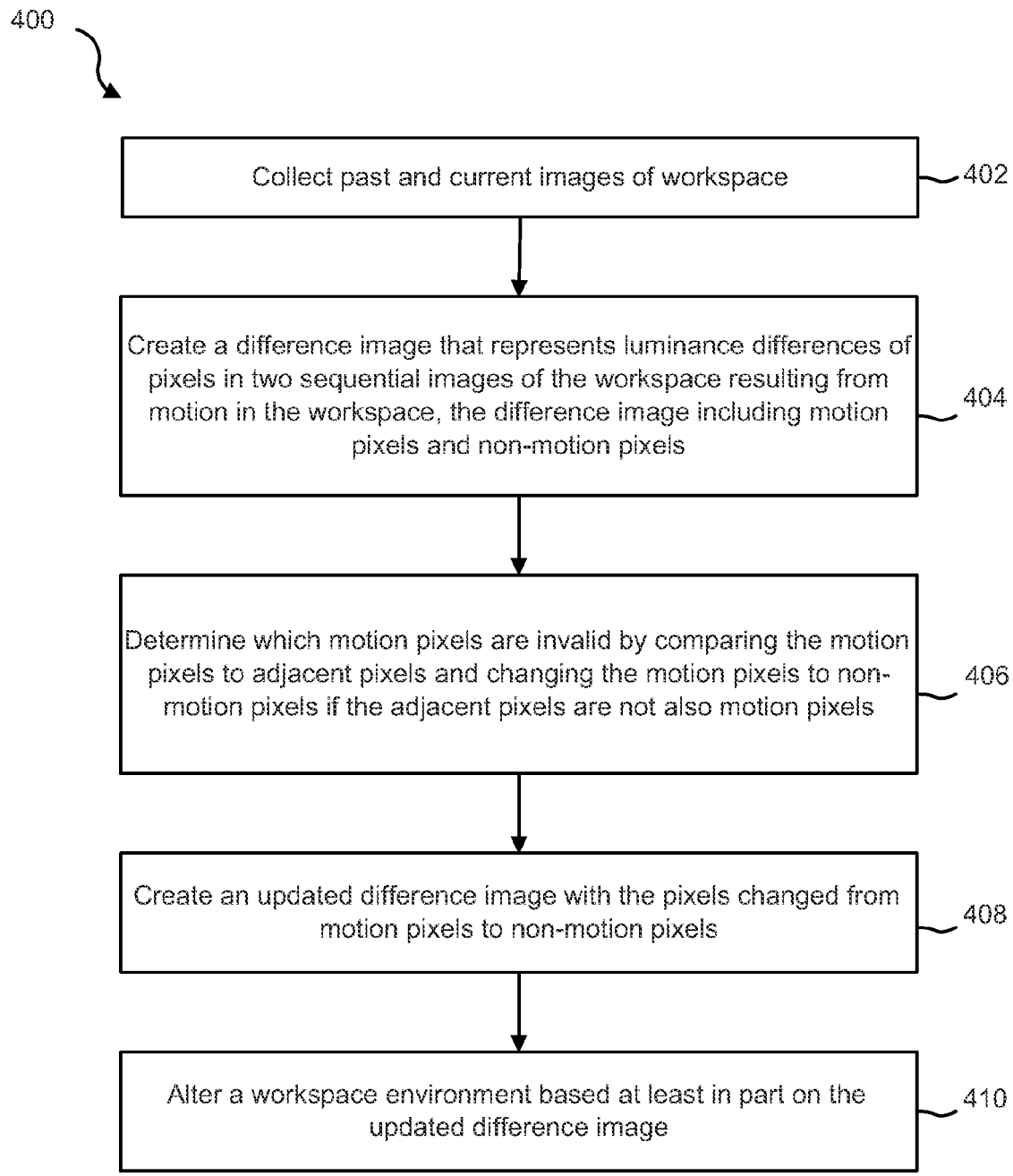
FIG. 17 is a flow diagram illustrating another example method for sensing occupancy of a workspace.

FIG. 17 shows another example method 400 that includes a step 402 of collecting past and current images of a workspace, and creating a difference image that represents luminance difference in pixels in two sequential images of the workspace resulting from motion in the workspace, wherein the difference image includes motion pixels and non-motion pixels in a step 404. A step 406 may include determining which motion pixels are invalid by comparing the motion pixels to adjacent pixels and changing the motion pixels to non-motion pixels if the adjacent pixels are not also motion pixels. A step 408 may include creating an updated difference image with the pixels changed from motion pixels to non-motion pixels. A workspace environment may be altered based at least in part on the updated difference image in step 410.

Another example step of method 400 may include comparing the motion pixels to a plurality of media adjacent of immediate neighboring pixels (e.g., 8 immediate neighboring pixels). The method 400 may include determining the number of motion pixels in each of a plurality of regions in the workspace and creating a trigger representative of the region that has the most motion pixels. Method 400 may include updating a state machine using the triggers, wherein the state machine controls the workspace environment. Another step may include creating a persistence image having a pixel corresponding to each pixel in a difference image, wherein the pixels in the persistence image are incremented in value each time a pixel on the difference image is determined to represent motion. The method 400 may include creating a motion history image representing how recently motion was detected in each motion pixel.

Figure 18:
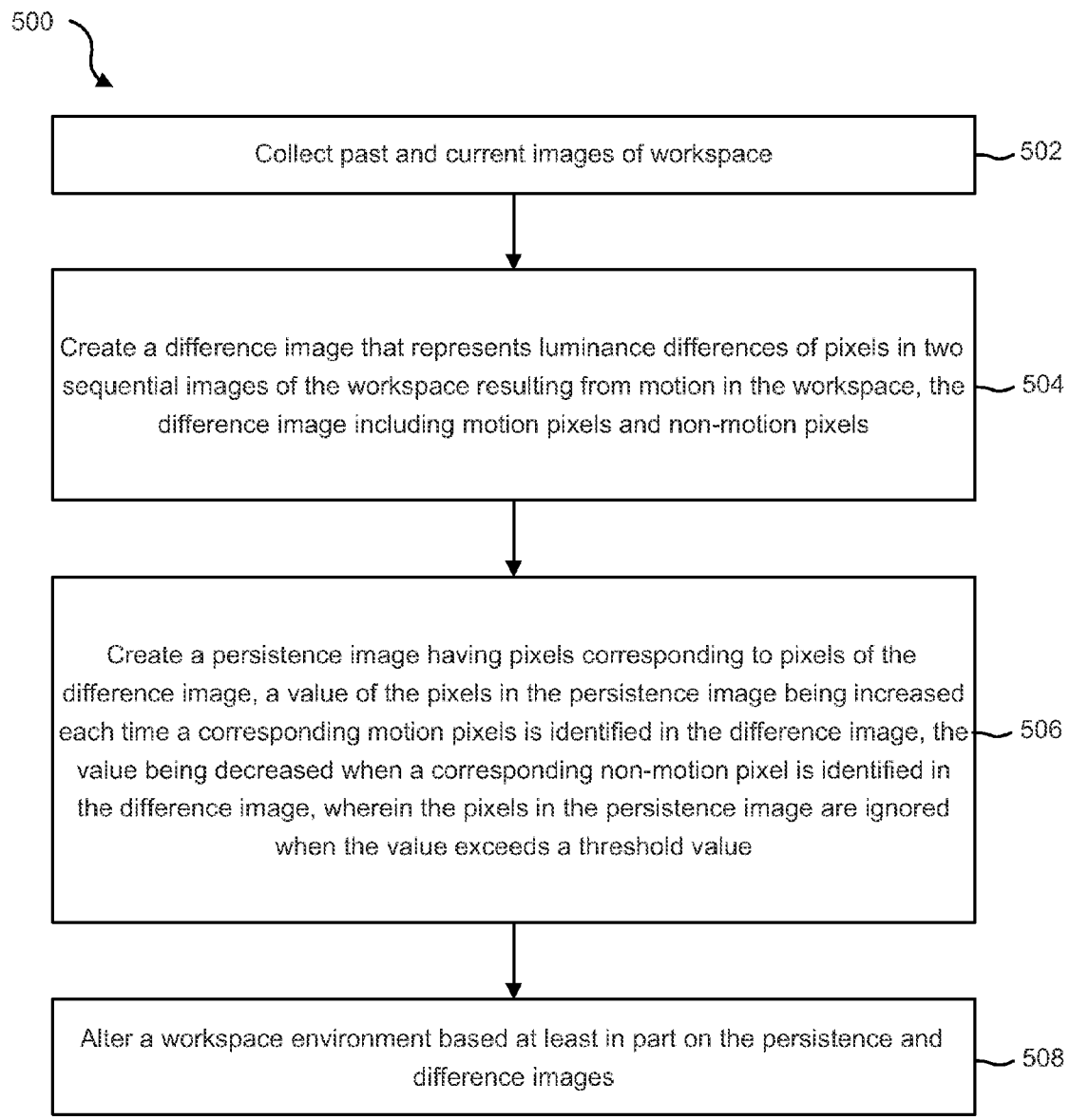
FIG. 18 is a flow diagram illustrating another example method for sensing occupancy of a workspace.

FIG. 18 shows another example method 500 that includes collecting past and current images of a workspace in step 502. The method 500 may include creating a difference image that represents luminance difference in pixels in two sequential images of the workspace resulting from motion in the workspace, wherein the difference image includes motion pixels and non-motion pixels in the step 504. Step 506 includes creating a persistence image having pixels corresponding to pixels of the difference image, the value of the pixels and the persistence image being increased each time a corresponding motion pixel is identified in the difference image, the value being decreased when a corresponding non-motion pixel is identified in the difference image, wherein the pixels in the persistence image are ignored when the value exceeds a threshold value. A step 508 includes altering a workspace environment based at least in part on the persistence and difference images.

The method 500 may also include determining a motion occurring in regions of the workspace based at least in part on the persistence and difference images. The method may also include creating a motion history image representing how recently a motion was detected in each motion pixel. The method 500 may include determining the number of pixels representing motion in each of the regions in the workspace and creating a trigger representative of the region having the most pixels representing motion. The method may include evaluating the triggers based on a pre-set priority. The method 500 may further include updating a state machine using a signal representing the trigger, the state machine controlling alterations to the workspace environment.

Figure 19:
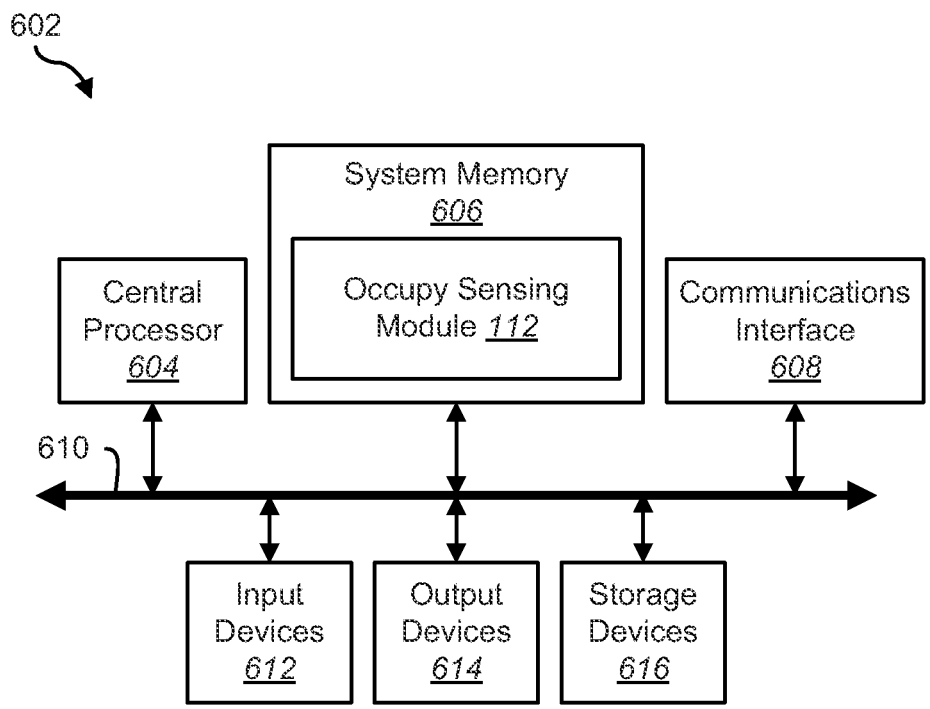
FIG. 19 depicts a block diagram of an electronic device suitable for implementing the present systems and methods.

FIG. 19 depicts a block diagram of an electronic device 602 suitable for implementing the present systems and methods. The electronic device 602 includes a bus 610 which interconnects major subsystems of electronic device 602, such as a central processor 604, a system memory 606 (typically RAM, but which may also include ROM, flash RAM, or the like), a communications interface 608, input devices 612, output device 614, and storage devices 616 (hard disk, floppy disk, optical disk, etc.).

Bus 610 allows data communication between central processor 604 and system memory 606, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the occupy sensing module 112 to implement the present systems and methods may be stored within the system memory 606. The occupy sensing module 112 may be an example of the occupy sensing module of FIGS. 1 and 2. Applications and/or algorithms resident with the electronic device 602 are generally stored on and accessed via a non-transitory computer readable medium (stored in the system memory 606, for example), such as a hard disk drive, an optical drive, a floppy disk unit, or other storage medium. Additionally, applications can be in the form of electronic signals modulated in accordance with the application and data communication technology when accessed via the communications interface 608

Communications interface 608 may provide a direct connection to a remote server or to the Internet via an internet service provider (ISP). Communications interface 608 may provide a direct connection to a remote server via a direct network link to the Internet via a POP (point of presence). Communications interface 608 may provide such connection using wireless techniques, including digital cellular telephone connection, Cellular Digital Packet Data (CDPD) connection, digital satellite data connection, or the like.

Many other devices or subsystems (not shown) may be connected in a similar manner. Conversely, all of the devices shown in FIG. 14 need not be present to practice the present systems and methods. The devices and subsystems can be interconnected in different ways from that shown in FIG. 14. The operation of an electronic device such as that shown in FIG. 14 is readily known in the art and is not discussed in detail in this application. Code to implement the present disclosure can be stored in a non-transitory computer-readable medium such as one or more of system memory 606 and the storage devices 616.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional electronic devices, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in an electronic device. In some embodiments, these software modules may configure an electronic device to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer implemented method for sensing occupancy of a workspace, comprising:
creating a difference image that represents luminance differences of pixels between past and current images of the workspace resulting from motion in the workspace;
determining motion occurring in regions of the workspace based on the difference image;
altering a workspace environment based at least in part on the determined motion;
determining which pixels in the difference image represent persistent motion that can be ignored;
determining which pixels representing motion in the difference image are invalid because the pixels are isolated from other pixels representing motion;
determining the number of pixels representing motion in each of a plurality of regions in the workspace and creating a trigger representative of the region having the most pixels representing motion;
evaluating the trigger based on a pre-set priority; and
updating a state machine using a signal representing the evaluated trigger, the state machine controlling the workspace environment.

2. The method of claim 1, wherein creating the difference image includes comparing an absolute value of the difference in luminance between the images to a threshold value, setting a corresponding pixel in the difference image to 1 if the difference is greater than the threshold value, and setting the corresponding pixel in the difference image to 0 if the difference is less than the threshold value.

3. The method of claim 1, further comprising:
comparing every pixel representing motion to immediate neighboring pixels, and if the immediate neighboring pixels are not pixels representing motion, changing a value of the compared pixel representing motion.

4. The method of claim 1, further comprising:
creating a persistence image having a pixel corresponding to each pixel in the difference image, the pixels in the persistence image being incremented in value each time a pixel in the difference image is determined to represent motion.

5. The method of claim 1, further comprising:
creating a motion history image representing how recently motion was detected in each pixel representing motion in the difference image.

6. The method of claim 5, further comprising:
assigning a pixel value to pixels in the motion history image corresponding to pixels in the difference image representing motion, and subtracting from the pixel value each time a pixel in the current image is determined to not represent motion.

7. A computer implemented method for sensing occupancy of a workspace, comprising:
- creating a difference image that represents luminance differences of pixels in two sequential images of the workspace resulting from motion in the workspace, the difference image including motion pixels and non-motion pixels;
- determining which motion pixels are invalid by comparing the motion pixels to adjacent pixels and changing the motion pixels to non-motion pixels if the adjacent pixels are not also motion pixels;
- creating an updated difference image with the pixels changed from motion pixels to non-motion pixels;
- altering a workspace environment based at least in part on the updated difference image;
- determining the number of motion pixels in each of a plurality of regions in the workspace, and creating a trigger representative of the region which has the most motion pixels; and
- updating a state machine using the trigger, the state machine controlling the workspace environment.

8. The method of claim 7, further comprising:
creating a persistence image having a pixel corresponding to each pixel in the difference image, the pixels in the persistence image being incremented in value each time a pixel in the difference image is determined to represent motion.

9. The method of claim 7, further comprising:
creating a motion history image representing how recently motion was detected in each motion pixel.

10. A computer implemented method for sensing occupancy of a workspace, comprising:
- creating a difference image that represents luminance differences of pixels in two sequential images of the workspace resulting from motion in the workspace, the difference image including motion pixels and non-motion pixels;
- creating a persistence image having pixels corresponding to pixels of the difference image, a value of the pixels in the persistence image being increased each time a corresponding motion pixel is identified in the difference image, the value being decreased when a corresponding non-motion pixel is identified in the difference image, wherein the pixels in the persistence image are ignored when the value exceeds a threshold value; and
- altering a workspace environment based at least in part on the persistence and difference images.

11. The method of claim 10, further comprising:
determining motion occurring in regions of the workspace based at least in part on the persistence and difference images.

12. The method of claim 10, further comprising:
creating a motion history image representing how recently motion was detected in each motion pixel.

13. The method of claim 11, further comprising:
determining the number of pixels representing motion in each of the regions in the workspace and creating a trigger representative of the region having the most pixels representing motion.

14. The method of claim 13, further comprising:
evaluating the trigger based on a pre-set priority.

15. The method of claim 13, further comprising:
updating a state machine using a signal representing the trigger, the state machine controlling alterations to the workspace environment.

* * * * *